Oct. 14, 1952     M. J. HABERKORN     2,613,469
FISH LURE
Filed March 6, 1950
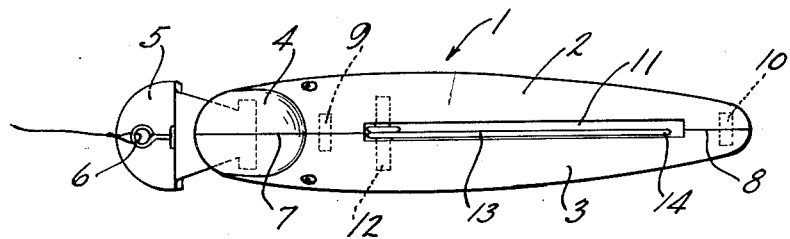
Fig:1
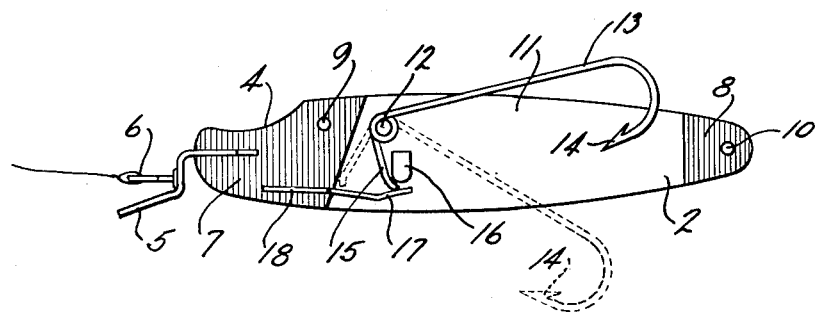
Fig:2
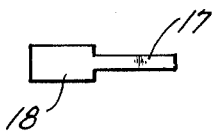
Fig:3
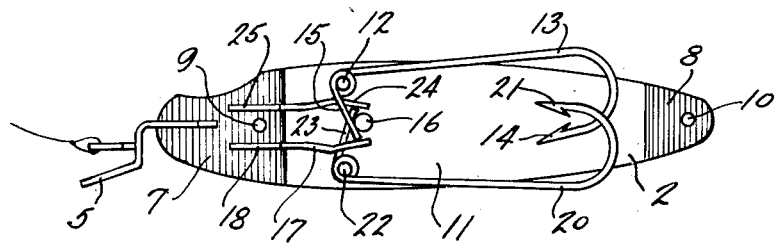
Fig:4
INVENTOR.
Matthew J. Haberkorn
BY Jacques J. Filling
ATTORNEY.

UNITED STATES PATENT OFFICE 2,613,469

FISH LURE

Matthew J. Haberkorn, Oak Park, Ill.

Application March 6, 1950, Serial No. 147,890

2 Claims. (Cl. 43—35)

The present invention relates in general to fish lures and the principal object of the invention is to design a new and improved artificial bait which is particularly adapted to casting and trolling.

Another object is to provide a novel fish lure of the plug type in which the barbed end of the hook is normally arranged so as to prevent any entanglement with weeds or the like as the lure is drawn through the water.

Another object of the invention is to provide a new and improved fish lure in which the hook is concealed in the lure as it is drawn through the water and is automatically ejected when a fish strikes the line.

A still further object is to provide a fish lure which is economical to manufacture, simple to employ, and reliable in action.

Other objects and features will be apparent during the course of the following description which together with the accompanying drawing, discloses the invention. Referring to the drawings:

Fig. 1 is a top view of the improved fish lure;

Fig. 2 is a side elevation of a half section of the body;

Fig. 3 is a top view of the leaf spring; while

Fig. 4 is a side view of a modification showing a double hook arrangement.

As shown in the drawings the improved fish lure comprises an elongated body portion generally indicated at 1 shaped to resemble a minnow and suitably colored as desired. The body may be made of any suitable material but preferably is made of molded plastic material comprising two similar half sections 2 and 3 joined together and having a dished front portion 4. A deflecting plate 5 is anchored in the body as shown and causes the fish lure to be drawn through the water with an erratic and diving action attractive to the fish. The eyelet 6 on the plate 5 serves for the attachment of the fish line to the lure. The two half sections 2 and 3 are cemented together at their flat contacting surfaces 7 and 8 reinforced by embedded pins 9 and 10 at opposite ends. The pins 9 and 10 may also be formed of the molded material itself if desired. An elongated slot 11 formed by oppositely disposed recesses in the half sections 2 and 3, extends for the major length of the body 1 and through the top and bottom thereof. This slot 11 serves to conceal the hook arrangement.

A pivot pin 12 which is embedded in the front end of the body and extends across the slot 11, serves as a pivot for the hook 13 the shank portion of which normally protrudes as shown outside the body and above the slot 11. The barbed end 14 of the hook is normally concealed within the slot 11 but is arranged for swinging movement or ejection downward and outward below the slot 11. The pivoted end of hook 13 has a portion wrapped once around pivot 12 and an extension formed at right angles thereto comprises a latch member 15 normally biased against a stop 16 formed in the body section 2. The free end of latch 15 is preferably curved slightly at the point it engages the stop 16. In order to normally bias the latch 15 in the position shown a leaf spring 17 is provided, the free end of which exerts its tension upwardly in slot 11 against the curved end of latch 15, while the opposite end 18 is firmly anchored in the half sections 2 and 3. A top view of the leaf spring 17 is shown more clearly in Fig. 3. The leaf spring 17 is so shaped and arranged that when the end of latch 15 is moved slightly away and to the left from stop 16 the spring will exert its power in the opposite direction against the latch to snap it into the dotted position shown and against the forward end of slot 11.

In use, the fish lure is drawn through the water with the hook arranged as shown in Fig. 2, the shank portion 13 protruding upwardly and the barbed end concealed within the slot 11 so as to prevent entanglement with weeds or other objects. The tension of leaf spring 17 is great enough so that light pressure against the hook caused by brushing against objects will not cause ejection of the hook. Moreover the fish line rides through the water with the hook shank uppermost precluding accidental operation of the hook. When a fish strikes the line it closes its upper jaw upon the hook shank 13 and since only a slight movement is required to cause the latch 15 to move away from its stop 16, the spring leaf 17 is effective to snap the latch to the left, thereby rotating the hook 13 downward about pivot 12 and through the slot 11. This snap action is effective to eject the barbed end 14 of the hook out of the lower end of the slot 11 and into the lower jaw of the fish thereby effectively hooking it.

The relationship of the latch arm 15 and the spring member 17 is such that the free extremity of the latch arm 15 moves relative to the spring member 17 from a position where the spring member holds the latch arm against the stop 16 and the hook shank 13 exposed, to a position whereby the spring member acts to snap the latch arm away from the stop 16 and to eject the barbed end 14 of the hook, when a fish strikes the hook shank 13.

To reset the lure the shank 13 of the hook is merely drawn backward and upward in the slot 11 until the latch 15 again engages stop 16 when the spring leaf 17 is effective to hold it in that position.

In the modification shown in Fig. 4 the hook arrangement of Fig. 2 is duplicated, with a separate hook being ejected from opposite sides of the slot in the fish lure. As shown a second hook is provided the shank 20 protruding from the bottom of the slot 11 and the barbed end 21 concealed within the slot. This slot 11 is necessarily made somewhat wider than that of Fig. 2 to accommodate the duplicate set of hooks which are arranged in side by side relationship. The pivot 22 serves for hook 20, and the latch 23 is biased against a common stop 16 also serving latch 15. The spring leaf 24 is arranged above spring 17 and is anchored at its end 25 in the front end of body section 2. The action is the same as described in connection with Fig. 2 except that a fish striking the lure will cause ejection of either barb end 14 or 21 or both, and thereby be more effectively hooked in either jaw or both jaws.

Further modifications will be apparent to those skilled in the art and it is desired, therefore, that the invention be limited only by the scope of the appended claims.

The invention having been described, what is claimed is:

1. In a fish lure, a body portion having an elongated slot extending through opposite sides of said body, a hook pivoted in one end of said slot having a barbed end normally concealed within the other end of said slot, the shank of said hook normally protruding from one side of said slot, a latch arm formed on the pivoted end of said hook, a stop within the slot, and a spring member comprising a leaf spring anchored in said body at one end of said body at one end of said slot and having a free end portion normally tensioned against the free end of said latch arm to hold the hook shank exposed, said latch arm being movable relative to said spring member to a position whereby said spring member acts upon said latch arm to cause the barbed portion of said hook to be ejected from said slot when a fish strikes said hook shank.

2. In a fish lure, a body portion having an elongated slot extending through opposite sides thereof, a hook pivoted in one end of said slot and having a barbed end normally concealed within the other end of said slot, the shank portion of said hook normally protruding from one side of said slot, a latch arm formed integral with said hook and extending at an angle from the pivoted end of the hook, a stop arranged within the slot, and a spring member comprising a leaf spring anchored in said body at one end of said body at one end of said slot and having a free end portion normally tensioned against the free end of said latch arm to hold the hook shank exposed, said latch arm being movable relative to said spring member to a position whereby said spring member acts upon said latch arm to cause the barbed portion of said hook to be ejected from said slot when a fish strikes said hook shank, the movement of said latch arm being limited between said stop and one end of said slot.

MATTHEW J. HABERKORN.

REFERENCES CITED

The following references are of record in the file of this patent:

UNITED STATES PATENTS

| Number | Name | Date |
|---|---|---|
| 1,173,694 | Witty | Feb. 29, 1916 |
| 1,348,670 | Viehweger | Aug. 3, 1920 |
| 1,462,949 | Walls | July 24, 1923 |
| 1,694,697 | Beidatsch | Dec. 11, 1928 |
| 2,381,231 | Spear | Aug. 7, 1945 |